Dec. 8, 1925.

W. F. HESTER

COTTON SPRAYER

Filed July 3, 1924

Inventor
W. F. Hester
By C. A. Snow & Co.
Attorneys.

Dec. 8, 1925.
W. F. HESTER
COTTON SPRAYER
Filed July 3, 1924
1,564,572
2 Sheets-Sheet 2
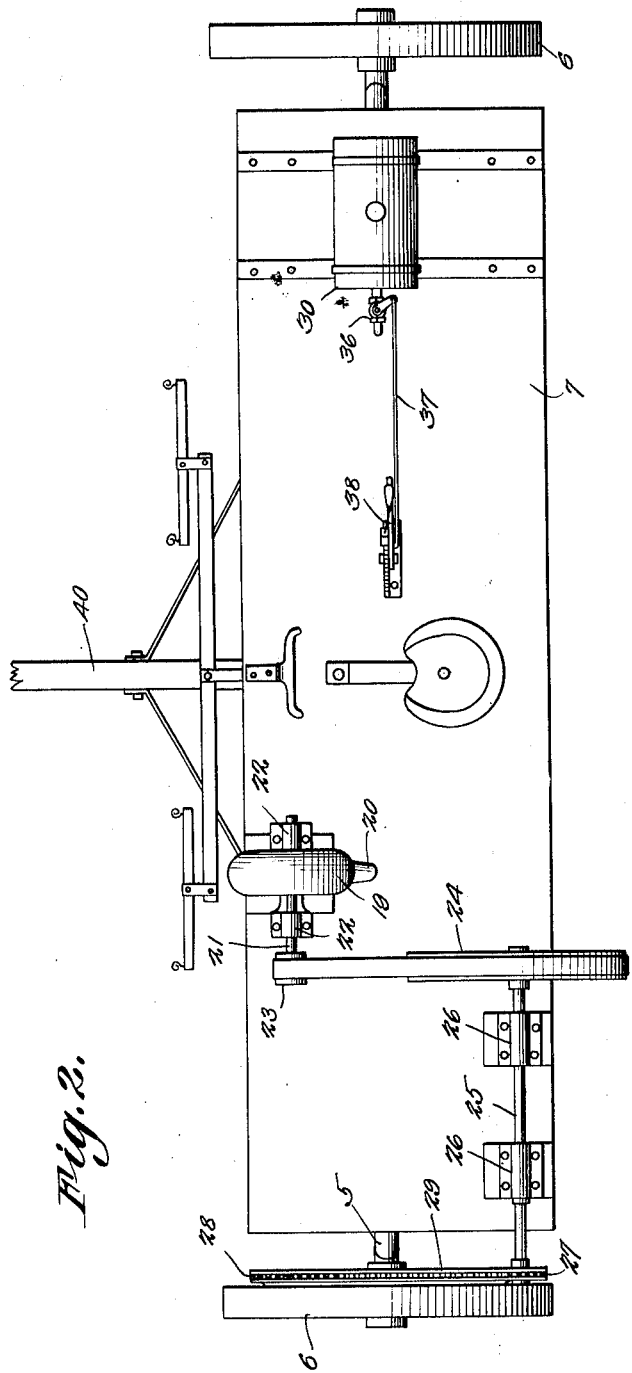
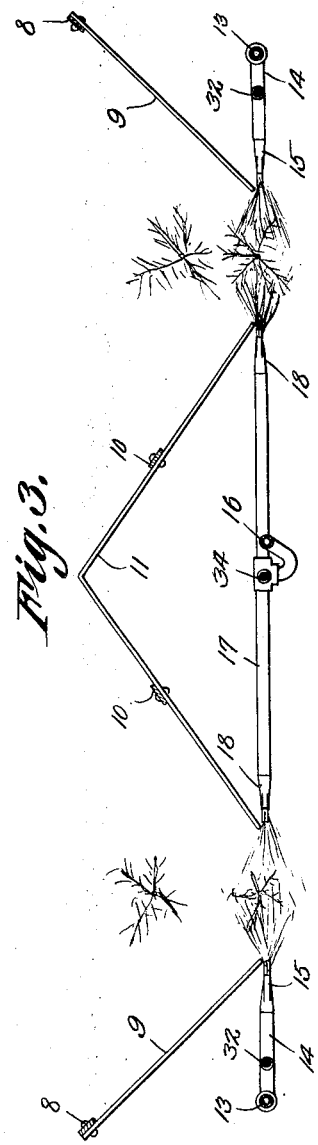
Inventor
W. F. Hester
By C. A. Snow & Co.
Attorneys Patented Dec. 8, 1925.

1,564,572

UNITED STATES PATENT OFFICE.

WILLIAM F. HESTER, OF O'BRIEN, TEXAS.

COTTON SPRAYER.

Application filed July 3, 1924. Serial No. 724,054.

*To all whom it may concern:*

Be it known that I, WILLIAM F. HESTER, a citizen of the United States, residing at O'Brien, in the county of Haskell and State of Texas, have invented a new and useful Cotton Sprayer, of which the following is a specification.

This invention relates to agricultural machines and aims to provide a novel form of spraying machine especially designed for spraying cotton or other plants planted in rows.

An important object of the invention is to provide a machine of this character wherein the liquid will be transformed into a fine spray at a point adjacent to the nozzles of the machine, to insure both the upper and lower surfaces of the plants under treatment receiving the fluid.

A still further object of the invention is to provide a machine of this character wherein several rows of plants may be treated simultaneously.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a plan view thereof.

Figure 3 is a diagrammatical view disclosing the manner of treating adjacent rows of plants simultaneously.

Figure 1:
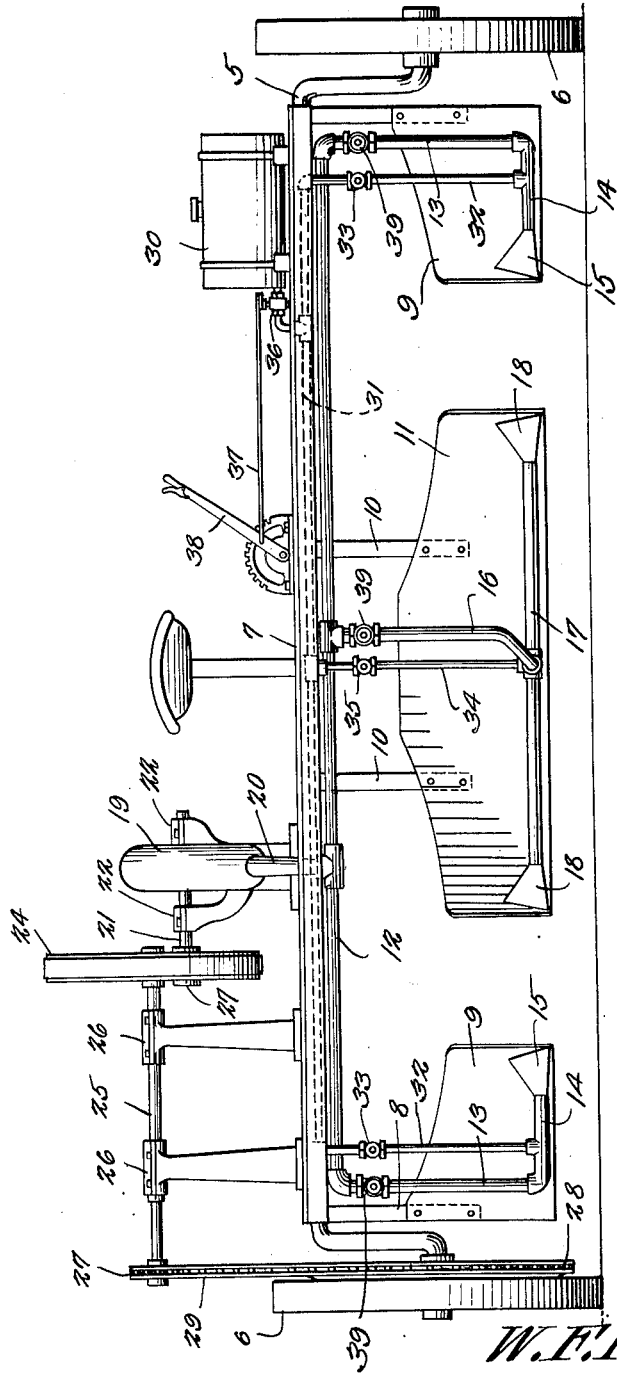
Figure 1 is a rear elevational view of a spraying machine constructed in accordance with the invention.

Referring to the drawings in detail, the device includes a supporting axle 5 on which the supporting wheels 6 are mounted. A platform 7 is secured to the axle and acts as a support for the various elements forming the invention.

Arms 8 extend downwardly from the platform 7 and support the guard plates 9 that are arranged at oblique angles with respect to the ends of the platform 7.

Disposed intermediate the ends of the platform and depending therefrom are arms 10 that support the plates 11 that are also diagonally disposed with respect to the front and rear edges of the platform, the free ends of the plates 9 and 11 being arranged in spaced relation with each other to allow plants to pass therebetween.

The reference character 12 indicates an air supply pipe which is disposed centrally of the platform and extends throughout the length thereof, there being provided downwardly extended end portions 13 terminating in right angled portions 14 that support the nozzles 15 at points directly behind the plates 9.

The pipe 16 communicates with the pipe 12 and also has communication with the horizontally disposed pipe 17 that carries nozzles 18 at its ends, which nozzles are arranged beyond the free ends of the plates 11, as clearly shown by Figure 1 of the drawings.

The fan housing 19 which is supported on the platform communicates with the pipe 12 through the pipe 20 so that a draft of air created in the fan housing 19 will be directed to the pipe 12 and exhausted through the nozzles which communicate therewith.

Mounted on the shaft 21 that operates in the bearings 22 is a suitable fan not shown, which fan rotates in the fan housing 19. The reference character 23 indicates a pulley mounted on one end of the shaft 21 which pulley receives motion from the pulley 24 mounted on the shaft 25 that is supported in the bearing 26, carried by the platform.

Secured to one end of the shaft 25 is a sprocket 27 that receives motion from the wheel 6 at one end of the axle 5 through the sprocket 28 carried thereby and chain 29 which is shown as operating over the sprockets 27 and 28. The tank 30 which is also supported on the platform is designed to contain the poisonous liquid to be sprayed and as shown, this tank 30 supplies liquid to the pipe 31 mounted under the platform and which as shown has communication with the nozzles 15, through the pipes 32, suitable valves 33 being provided for regulating the amount of fluid passing through the pipes to the nozzles.

The nozzles 18 are supplied with liquid through the pipe 34, which is also supplied with a valve 35 for controlling the passage of air to the nozzles. The reference character 36 indicates a valve member controlled by the movement of the rod 37 that is controlled by the lever 38 disposed adjacent to the operator's seat, so that the operator may by moving the lever 38 and rod 37 operate the valve 36 to allow fluid to pass to the nozzles at the will of the operator.

Valve members 39 are provided in the pipes that supply air to the nozzles so that the amount of air passing to the nozzles will be regulated at the will of the operator, to the end that a strong or weak solution may be sprayed onto the plants under treatment.

The tongue of the wagon is indicated at 40 and affords means whereby draft animals may be hitched to the machine to pull the machine over the ground surface.

From the foregoing it will be obvious that when the machine is moved over the ground surface, air will be forced from the fan housing will be directed through the pipes and discharged through the nozzles. In view of the fact that the pipes 32 supply liquid from tank 30, to the nozzles, it will be obvious that as the air passes through the pipes the liquid will be picked up and forced through the nozzles in the form of a fine spray.

As the machine is moved along adjacent rows of plants, the plates 9 and 11 contact with the plants to force the plants inwardly towards the nozzles, where they will be thoroughly treated with the poisonous solution.

I claim:—

A spraying device comprising a wheel supported frame, a transversely extending horizontally disposed discharge pipe supported at the rear of the frame, pipes extending downwardly from the discharge pipe, nozzle carrying pipes communicating with the downwardly extended pipes, and arranged in parallel relation with the first mentioned pipe under the frame, nozzles carried by the ends of the last mentioned pipes, vertically disposed plates arranged in advance of said last mentioned pipes, and intersecting the horizontal plane of said pipes on lines oblique to the axis of said pipes, each plate having one end in proximity to a nozzle, and said plates adapted to engage plants over which the machine is moving to move the plants adjacent to the nozzles.

In testimony that I claim the foregoing as my own, I have hereto affixed my signature.

WILLIAM F. HESTER.